Sept. 16, 1958     E. HAECKER     2,852,204
FISHING REEL
Filed Aug. 23, 1955

INVENTOR.
EUGENE HAECKER
BY Harry Langsam
ATTORNEY

United States Patent Office 2,852,204
Patented Sept. 16, 1958

2,852,204

FISHING REEL

Eugene Haecker, Philadelphia, Pa.

Application August 23, 1955, Serial No. 530,034

3 Claims. (Cl. 242—84.1)

My invention relates to a fishing reel, and particularly relates to a fishing reel having an overload safety device to prevent spool failure when excessive line stress is applied.

During the winding operation of a fishing reel, it is desirable to have the line wrapped in even layers about the spool to prevent backlash and fouling when casting. In order to further facilitate the winding operation, the spools are fabricated so that the spool flanges are conical or arcuate sections, convexly facing one another, thereby presenting a diverging channel for receiving the line uniformly. Because of the slope of the spool flanges, a considerable amount of lateral force is exerted by the line against the flanges, particularly when the line is uniformly distributed across the channel and abutting the flanges themselves. When the line stress becomes large, there is a great tendency for the spool to fail and crack because of high lateral strain.

It is, therefore, an object of my invention to construct a fishing reel having a safety overload relief for large line stress to prevent spool failure when excessive lateral force is applied against the spool flanges.

Another object of my invention is to construct a safety overload relief for a fishing reel which will not interfere with normal casting or winding operation and will relieve fouling during the casting of the line.

Another object of my invention is to provide a safety overload relief for a fishing reel which will prevent spool failure and enable the fisherman to continue to reel in after the yield strength of the spool is exceeded.

Other objects of my invention are to provide an improved device of the character described, that is easily and economically produced, which is sturdy in construction, and which is highly effective in operation.

With the above and related objects in view, my invention consists in the details of construction and combination of parts, as will be more fully understood from the following description, when read in conjunction with the accompanying drawing, in which.

Referring now in greater detail to the drawing, in which similar reference characters refer to similar parts, I show a fishing reel comprising a spool, generally designated A, a frame, generally designated B, and a winding mechanism, generally designated C.

Figure 1:
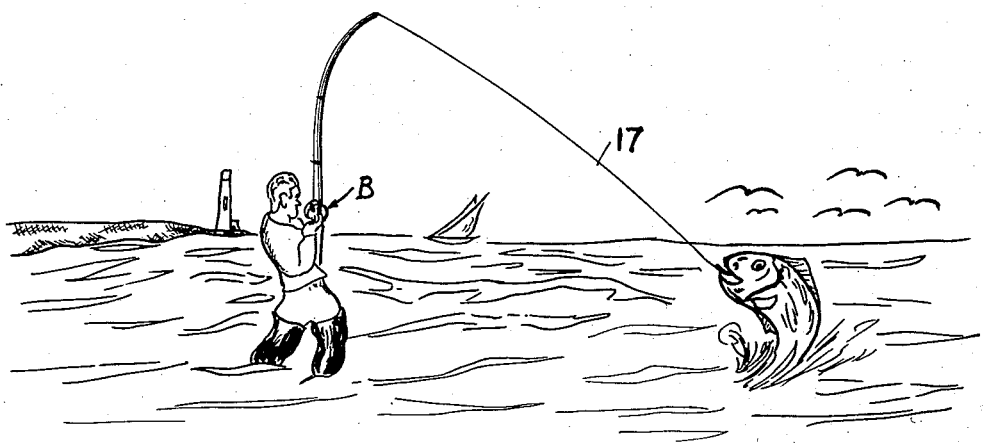
Fig. 1 is a perspective view of a fishing scene illustrating the application of a large stress upon fishing tackle resulting from the difference in relative size of the hooked fish and the reel itself.

The spool A comprises a core 12 having a pair of interiorly facing, convex flanges 14 at each end to define a diverging annular channel 16. The core 12 is split into two sections 12A and 12B at 18 intermediate the flanges, each core section having a plurality of teeth 20 adjacent the split 18 whereby the two sections are adapted to intermesh and form a smooth surfaced, integral core. A spindle 22, which is rotatably supported in the end frames, passes through a bored hole 24 in the core 12. The core section 12A is slidably supported upon the spindle 22 while the core section 12B is securely affixed to the spindle. The core section 12B is geared in a conventional manner to the winding mechanism C and any suitable clutch and drag assembly may be utilized.

Figure 2:
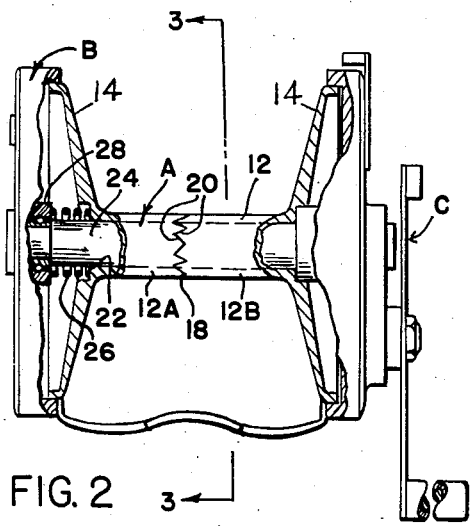
Fig. 2 is a fragmentary side view of a fishing reel embodying my invention showing my spool overload relief in normal position.
Figure 3:
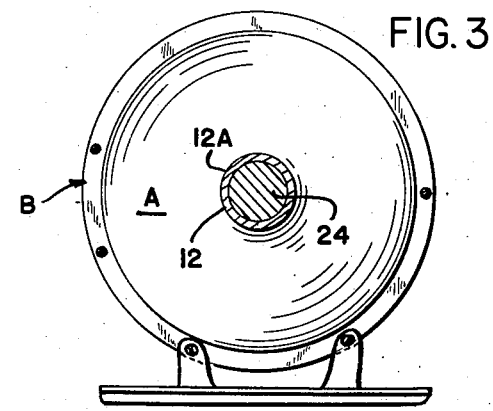
Fig. 3 is a sectional view taken along lines 3—3 of Fig. 2.
Figure 4:
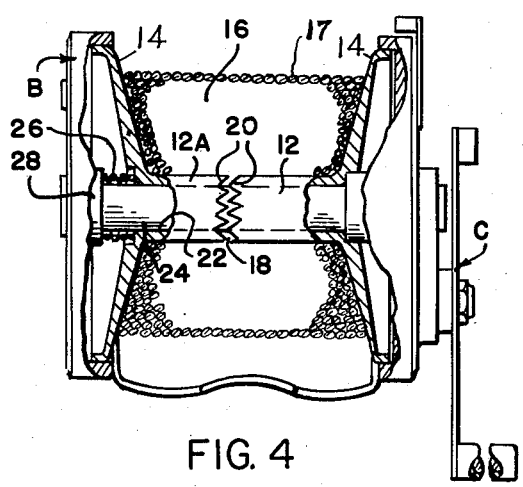
Fig. 4 is a fragmentary side view of the fishing reel illustrating the position of the spool overload relief when excessive lateral force is applied against the spool flanges.

The safety overload feature is designed into the spool section 12A and is best illustrated in Fig. 2 and 4. A coil spring 26 is axially mounted upon the spindle 24 intermediate the flange 14 on section 12A and the adjacent end frame B. The coil spring 26 abuts a rotary bearing 28, which is affixed to the spindle 24 adjacent the end frame B, and forces the core sections 12A and 12B into interlocking engagement by pressing against the counterbore 30 at the end of the spool section 12A.

In Fig. 2 is shown the normal position of the spool A wherein it functions as any conventional fishing reel. The spring 26 maintains the two core sections 12A and 12B in firm intermeshing engagement.

In Fig. 4 is shown the relieved position of the spool A. The spool is separated into its component sections 12A and 12B as the lateral pressure of the line exceeds the spring pressure and forces against the diametric flanges 14.

It is to be noted that the two core sections 12A and 12B are never completely disengaged. The frame B acts as a stop against the periphery of the flange on section 12A, thus limiting the separation of the split 18 and maintains engagement of the teeth in each core section. It is therefore apparent that the line cannot fall into the split and jam the reel. Smooth operation of the spool and constant spring pressure is assured by keeping the spring 26 rotatable with the spindle 24 and the spool A.

As is apparent from the foregoing description, my reel operates as follows: As the line is reeled in and the stress of the line causes sufficient lateral pressure upon the flanges 14 to overcome the pressure of the spring 26, the core section 12A slides longitudinally until the lateral pressure and the spring pressure reach equilibrium. However, the two core sections are maintained in meshing engagement so that core section 12A continues to rotate with section 12B. The core section 12A will longitudinally slide approximately the width of the line along the spindle 24 as each application of stress exceeds the spring pressure until the stop limit of the periphery of the flange of the sliding section 12A is reached.

Figure 5:
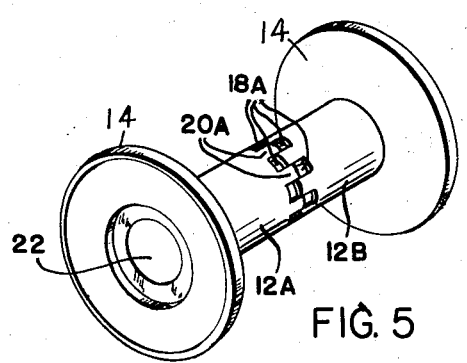
Fig. 5 is a perspective view of a spool modification embodying my invention before assembly upon the fishing reel.

In Fig. 5, I show a spool modification wherein the overlapping spur teeth 20A permit greater separation of the core section 12A while maintaining a positive intermeshing position of the two core sections.

In addition to preventing spool failure during the reeling operation, my split spool also serves to reduce backlash and fouling during casting. This beneficial effect occurs as a result of the two core sections moving apart during the cast when any layer is tautly wound longitudinally along the core or when a coil of line is trapped adjacent a flange under a layer of wound line.

Although my invention has been described in considerable detail, such description is intended as being illustrative rather than limiting, since the invention may be variously embodied, and the scope of the invention is to be determined as claimed.

I claim as my invention:

1. In a fishing reel having a winding mechanism and a spindle rotatably supported in a pair of end frames, a split spool comprising a pair of core sections, a pair of axially spaced, inwardly convex flanges on said spool, one flange being integrally mounted upon each core section, a plurality of peripheral teeth on adjacent ends of each core section in peripheral intermeshing engagement with one another, one of said core sections being securely affixed to said spindle and being directly engaged by said winding mechanism, the other of said core sections being slidably supported upon said spindle and rotatable with said first core section, a coil spring longitudinally mounted upon said spindle intermediate said second core section and its adjacent end frame forcing the two core sections into smooth interfitting engagement, said core sections being adapted to be longitudinally separated from one another while in rotatable engagement when the lateral pressure against the axially spaced spool flanges exceeds the coil spring pressure.

2. In a fishing reel having a winding mechanism and a spindle rotatably supported in a pair of end frames, a split spool comprising a pair of core sections, a plurality of peripheral teeth on adjacent ends of each of said core sections in peripheral intermeshing engagement with one another, one of said core sections being fixed to said spindle and in direct engagement with said winding mechanism, the other of said core sections being axially slidable on said spindle and normally rotatable with said first core section, and resilient means axially urging said slidable core section into engagement with said fixed core section whereby the core sections will separate when the lateral pressure exerted by a fishing line wound upon the spool exceeds the axial force of said resilient means.

3. In a fishing reel having a winding mechanism and a spindle rotatably supported in a pair of end frames, a split spool comprising an axially fixed core section, an axially slidable core section, a plurality of peripheral teeth on adjacent ends of each of said core sections in normal peripheral engagement with one another, and resilient means axially urging said axially slidable core section toward said axially fixed core section whereby the core sections will axially separate when the lateral pressure exerted by a fishing line wound upon the spool exceeds the axial force exerted by said resilient means.

References Cited in the file of this patent

UNITED STATES PATENTS

| 221,395 | Cass | Nov. 11, 1879 |
| 2,344,665 | Adams | Mar. 21, 1944 |
| 2,406,434 | Payne | Aug. 27, 1946 |
| 2,438,440 | Hirsch | Mar. 23, 1948 |